US012286563B2

(12) United States Patent
Milliman et al.

(10) Patent No.: US 12,286,563 B2
(45) Date of Patent: Apr. 29, 2025

(54) BUTYL RUBBER BASED PRESSURE SENSITIVE ADHESIVES

(71) Applicant: Avery Dennison Corporation, Mentor, OH (US)

(72) Inventors: Henry W. Milliman, Painesville, OH (US); Marcela Castano, Northfield, OH (US); Dong-Tsai Hseih, Arcadia, CA (US)

(73) Assignee: Avery Dennison Corporation, Mentor, OH (US)

( * ) Notice: Subject to any disclaimer, the term of this patent is extended or adjusted under 35 U.S.C. 154(b) by 11 days.

(21) Appl. No.: 17/615,325

(22) PCT Filed: May 20, 2020

(86) PCT No.: PCT/US2020/033673
§ 371 (c)(1),
(2) Date: Nov. 30, 2021

(87) PCT Pub. No.: WO2020/256879
PCT Pub. Date: Dec. 24, 2020

(65) Prior Publication Data
US 2022/0220347 A1   Jul. 14, 2022

Related U.S. Application Data

(60) Provisional application No. 62/862,947, filed on Jun. 18, 2019.

(51) Int. Cl.
| | | |
|---|---|---|
| C09J 123/22 | (2006.01) | |
| C09J 7/38 | (2018.01) | |
| C09J 7/40 | (2018.01) | |

(52) U.S. Cl.
CPC ............. *C09J 123/22* (2013.01); *C09J 7/383* (2018.01); *C09J 7/405* (2018.01); *C09J 2423/00* (2013.01); *C09J 2467/005* (2013.01)

(58) Field of Classification Search
None
See application file for complete search history.

(56) References Cited

U.S. PATENT DOCUMENTS

| | | |
|---|---|---|
| 2,442,083 A | 5/1948 | Hall et al. |
| 2,933,117 A | 4/1960 | Baldwin et al. |
| 2,955,103 A | 10/1960 | Baldwin et al. |
| 4,159,363 A | 6/1979 | Elmer et al. |
| 4,496,694 A | 1/1985 | Forgo et al. |
| 4,554,346 A | 11/1985 | Gaku et al. |
| 4,591,617 A | 5/1986 | Berta |
| 4,755,548 A | 7/1988 | Iwasa et al. |
| 5,037,886 A | 8/1991 | Blizzard et al. |
| 5,051,472 A | 9/1991 | Blizzard et al. |
| 5,397,837 A | 3/1995 | Arjunan |
| 5,643,676 A * | 7/1997 | Dobashi ..................... C09J 7/22 428/908.8 |
| 5,654,116 A | 8/1997 | Kato et al. |
| 7,025,851 B2 | 4/2006 | Caster et al. |
| 7,572,861 B2 | 8/2009 | Achten et al. |
| 7,671,130 B2 | 3/2010 | Crafton et al. |
| 8,597,447 B2 | 12/2013 | Utesch et al. |
| 8,673,996 B2 | 3/2014 | Lee et al. |
| 9,422,464 B2 | 8/2016 | Lee et al. |
| 9,562,180 B2 | 2/2017 | Lee et al. |
| 2002/0015519 A1 | 2/2002 | Tokas et al. |
| 2003/0096904 A1 | 5/2003 | Hakuta et al. |
| 2003/0144400 A1* | 7/2003 | Osen .................. C09D 115/005 524/495 |
| 2004/0229999 A1 | 11/2004 | Achten et al. |
| 2007/0015893 A1 | 1/2007 | Hakuta et al. |
| 2007/0123619 A1 | 5/2007 | Kulbaba et al. |
| 2008/0039576 A1 | 2/2008 | Griswold et al. |
| 2010/0300528 A1* | 12/2010 | Fujii ...................... B32B 15/20 428/608 |
| 2011/0098382 A1 | 4/2011 | Czaplicki |
| 2013/0172446 A1* | 7/2013 | Smale ..................... C08K 5/01 523/351 |
| 2015/0197586 A1 | 7/2015 | Hidalgo et al. |
| 2016/0108141 A1* | 4/2016 | Nguyen ................ C08C 19/32 525/332.3 |
| 2016/0152871 A1* | 6/2016 | Bieber ................ C08L 23/0815 521/140 |
| 2016/0193505 A1 | 7/2016 | Binette et al. |
| 2018/0155528 A1 | 6/2018 | Seo et al. |

FOREIGN PATENT DOCUMENTS

| | | |
|---|---|---|
| CA | 2269741 | 10/1999 |
| CN | 1658339 | 8/2005 |
| CN | 101024707 | 8/2007 |
| CN | 101629025 | 3/2011 |
| CN | 102785627 | 11/2012 |
| CN | 103254849 | 8/2013 |

(Continued)

OTHER PUBLICATIONS

International Search Report and Written Opinion dated Jul. 28, 2020 issued in corresponding IA No. PCT/US2020/033673 filed May 20, 2020.
International Preliminary Report on Patentability dated Dec. 21, 2021 issued in corresponding IA No. PCT/US2020/033673 filed May 20, 2020.

*Primary Examiner* — Scott R. Walshon
*Assistant Examiner* — Thomas A Mangohig

(57) ABSTRACT

Provided herein are butyl rubber based pressure sensitive adhesive compositions comprising low molecular weight polyisobutylene oligomers and a multifunctional crosslinker. These adhesive compositions can exhibit high adhesion and shear resistance without requiring curing at high temperature to provide the compositions with these advantageous performance properties. Also provided are adhesive tapes and methods using the disclosed adhesive compositions.

28 Claims, No Drawings

(56) References Cited

FOREIGN PATENT DOCUMENTS

| | | |
|---|---|---|
| CN | 103937432 | 7/2014 |
| CN | 104344097 | 2/2015 |
| CN | 104419087 | 3/2015 |
| CN | 104507979 | 4/2015 |
| CN | 105238080 | 1/2016 |
| CN | 105452352 | 3/2016 |
| CN | 105961391 | 9/2016 |
| CN | 106035330 | 10/2016 |
| CN | 106298006 | 1/2017 |
| CN | 106633179 | 5/2017 |
| CN | 107033833 | 8/2017 |
| CN | 105419012 | 10/2017 |
| CN | 107418495 | 12/2017 |
| CN | 109266275 | 1/2019 |
| CN | 109468092 | 3/2019 |
| DE | 102016100159 | 6/2017 |
| EP | 1080157 | 3/2001 |
| EP | 2610278 | 7/2013 |
| EP | 2832780 | 2/2015 |
| FR | 1067826 | 6/1954 |
| FR | 1204619 | 1/1960 |
| FR | 1455378 | 4/1966 |
| GB | 829564 | 3/1960 |
| GB | 983518 | 2/1965 |
| GB | 1029732 | 5/1966 |
| JP | 3057822 | 7/2000 |
| JP | 4061827 | 3/2008 |
| JP | 2017-057240 | 3/2017 |
| JP | 2018-168218 | 11/2018 |
| KR | 1992-0018935 | 10/1992 |
| KR | 10-0575040 | 4/2006 |
| KR | 10-0614887 | 8/2006 |
| KR | 10-0730982 | 6/2007 |
| KR | 10-0730983 | 6/2007 |
| KR | 10-0845687 | 7/2008 |
| KR | 10-0918914 | 9/2009 |
| KR | 2016-0002299 | 7/2016 |
| WO | 92/13901 | 8/1992 |
| WO | 95/23036 | 8/1995 |
| WO | 1999/054386 | 10/1999 |
| WO | 2000/001528 | 1/2000 |
| WO | 2000/053638 | 9/2000 |
| WO | 03/054032 | 7/2003 |
| WO | 2004/019421 | 3/2004 |
| WO | 2004/046214 | 6/2004 |
| WO | 2004/083266 | 9/2004 |
| WO | 2005/068186 | 7/2005 |
| WO | 2005/084191 | 9/2005 |
| WO | 2008/021318 | 2/2008 |
| WO | 2014/084349 | 4/2008 |
| WO | 2008/112992 | 9/2008 |
| WO | 2008/141929 | 11/2008 |
| WO | 2008/149583 | 12/2008 |
| WO | 2009/154155 | 12/2009 |
| WO | 2012/039203 | 3/2012 |
| WO | 2013/019695 | 2/2013 |
| WO | 2013/019763 | 2/2013 |
| WO | 2013/058130 | 4/2013 |
| WO | 2013/083565 | 6/2013 |
| WO | 2013/147989 | 10/2013 |
| WO | 2014/042047 | 3/2014 |
| WO | 2014/095382 | 6/2014 |
| WO | 2015/017414 | 2/2015 |
| WO | 2015/047022 | 4/2015 |
| WO | 2015/157914 | 10/2015 |
| WO | 2015/165772 | 11/2015 |
| WO | 2016/003116 | 1/2016 |
| WO | 2016/008371 | 1/2016 |
| WO | 2016/008373 | 1/2016 |
| WO | 2016/077131 | 5/2016 |
| WO | 2016/204381 | 12/2016 |
| WO | 2017/045865 | 3/2017 |
| WO | 2017/045903 | 3/2017 |
| WO | 2017/117576 | 7/2017 |
| WO | 2017/219219 | 12/2017 |
| WO | 2018/187249 | 10/2018 |
| WO | 2018/191186 | 10/2018 |

\* cited by examiner

BUTYL RUBBER BASED PRESSURE SENSITIVE ADHESIVES

CROSS-REFERENCE TO RELATED APPLICATION

The present application is a 371 of International Application No. PCT/US2020/033673, which was published in English on Dec. 24, 2020, and claims the benefit of U.S. Provisional Patent Application No. 62/862,947 filed Jun. 18, 2019, both of which are incorporated herein by reference in their entireties.

FIELD

The present disclosure relates generally to butyl rubber based pressure sensitive adhesives particularly useful for applications requiring high adhesion and shear performance, including applications requiring higher temperatures.

BACKGROUND

Pressure sensitive adhesives based on polyisobutylene and butyl rubber are known to be useful in a wide variety of applications (Handbook of Adhesives, Third Edition, I. Skeist, Chapter 10, p. 185). For example, polyisobutylene and butyl rubber each can provide pressure sensitive adhesives with a number of properties, such as high gas and moisture impermeability and good environmental resistance, that are beneficial for particular uses. Additionally, in part because of the low polarity of butyl rubber, adhesives formulated with butyl rubber can have excellent low surface energy bonding characteristics. Polyisobutylene and butyl rubber can also be combined with other additives to produce adhesives having a wide range of adhesion and other physical properties. Depending on the particular additives chosen, pressure sensitive adhesives formulated from butyl rubber can, for example, have good low temperature properties such as cold slam durability important in the automotive industry.

The chemical structure of butyl rubber typically differs from that of polyisobutylene in the addition of small amounts of isoprene as a comonomer. Butyl rubber can be further modified through halogenation which can increase the reactivity of the rubber with a variety of curing agents. Also available are butyl rubber products which include a para-methyl styrene (4-methylstyrene) comonomer. Although these p-methyl styrene containing rubbers are not commonly used for adhesive applications, when they are halogenated they can be even more reactive than halogenated butyl rubber.

Conventional uncured polyisobutylene or butyl rubber based adhesives can have good peel adhesion and tack properties. These uncured adhesives often suffer, however, from a-low shear strength, undesired creep, and poor performance at high temperatures due to the viscoelastic nature of the adhesive (measured using the shear adhesion failure temperature, or SAFT, of pressure sensitive adhesives under ASTM D4498 (2007). In some cases, by curing or cross-linking a butyl rubber adhesive, a better balance of peel, tack, shear, and temperature resistance can be obtained. Current curing techniques for these adhesives unfortunately involve the exposure of the adhesive to high temperatures for prolonged residence times. In view of these conventional technologies, the need therefore remains for improved butyl rubber based adhesive formulations that can provide high adhesion and shear properties without requiring extreme or specialized curing treatment procedures.

SUMMARY

In one embodiment, the disclosure is to an adhesive composition comprising: 1) halogenated butyl rubber, polyisobutylene oligomers, polybutene oligomers, polyisobutylene-polybutene copolymer oligomers, and/or polybutene copolymers; and 2) a multifunctional crosslinker. In certain aspects, the concentration of the halogenated butyl rubber in the adhesive composition ranges from about 10 wt % to about 40 wt %, e.g., from about 15 wt % to about 35 wt %. In many embodiments, the concentration of the polyisobutylene oligomers can range, for example, from 40 wt % to 90 wt %. In many embodiments, the concentration of the polyisobutylene oligomers in the adhesive composition is greater than 50 wt %, e.g., greater than 65 wt %. In certain aspects, the concentration of the polyisobutylene oligomers in the adhesive ranges from about 60 wt % to about 90 wt %, e.g., from about 65 wt % to about 85 wt %. In certain aspects, the number average molecular weight of the polyisobutylene oligomers ranges from 500 grams per mole to 30,000 grams per mole. Preferably, the concentration of the multifunctional crosslinker in the adhesive composition ranges from 0.01 wt % to 4 wt %, e.g., from about 0.03 wt % to about 2 wt %, or from about 0.05 wt % to about 1 wt %. In certain aspects, the multifunctional crosslinker comprises an amine. In certain aspects, the amine comprises triethylenetetramine, hexamethylene diamine, polyalkene oxide diamine, polyalkene oxide triamine, or a combination thereof. In certain aspects, the multifunctional crosslinker comprises a phosphine. In many embodiments, at least one multifunctional crosslinker is an amine crosslinker, a phosphine crosslinker, and combinations thereof. The adhesive composition can further comprise one or more catalysts and/or a non-nucleophilic base. In certain aspects, the concentration of the one or more catalysts in the adhesive composition is from 0.01 wt % to 1.3 wt %. In certain aspects, the one or more catalysts comprise one or more alkylamines. In certain aspects, the one or more alkylamines comprise one or more tertiary alkylamines. In certain aspects, the one or more tertiary alkylamines comprise 1,4-diazabicyclo[2.2.2]octane or 1-azabicyclo[2.2.2]octane. In certain aspects, the non-nucleophilic base comprises calcium carbonate. Preferably, the adhesive can have a 1-kilogram stainless steel static shear greater than 100 minutes as measured by Static Shear PTSC-7, e.g., greater than 1000 minutes, greater than 3200 minutes, or greater than 10,000 minutes. In certain aspects, the adhesive composition has a stainless steel shear adhesion failure temperature greater than 100° C. In certain aspects, the adhesive composition has a stainless steel dynamic shear greater than 10 pounds per square inch, e.g., greater than 20 pounds per square inch. In certain aspects, the adhesive composition has a stainless steel peel adhesion from 175 Newtons per meter to 1926 Newtons per meter, e.g., greater than 350 Newtons per meter, e.g. greater than 525 Newtons per meter.

In another embodiment the disclosure relates to a method of preparing a tape comprising an adhesive composition. The method comprises combining halogenated butyl rubber, polyisobutylene oligomers, polybutene oligomers, polyisobutylene-polybutene copolymer oligomers, and/or polybutene copolymers to form a mixture. In certain aspects, the combining further includes combining a solvent with the halogenated butyl rubber and the polyisobutylene to form the mixture. Preferably, the mass of the polyisobutylene oligomers in the mixture is greater than the mass of the halogenated butyl rubber in the mixture. In certain aspects, the combining further includes combining a solvent with the halogenated butyl rubber and the polyisobutylene to form the mixture. The method further comprises adding a multifunctional crosslinker to the mixture, thereby forming any of the adhesive compositions disclosed herein. The method further comprises coating an adhesive layer comprising the adhesive composition onto a substrate, thereby preparing the tape. Preferably, the adhesive layer has a thickness ranging from 10 microns to 2000 microns. In certain aspects, the substrate comprises a backing layer, a release liner, a nonwoven layer, or a foil layer.

In another embodiment, the disclosure is to a tape comprising at least one adhesive layer. At least one adhesive layer of the tape comprises any of the adhesive compositions disclosed herein.

In another embodiment, a method of applying a tape to a surface is described herein. The method comprises providing a surface having an outer face. The method further comprises providing a tape as disclosed herein. The method further comprises adhering the adhesive layer of the tape to the outer face of the surface, thereby applying the tape to the surface.

In another embodiment, a taped surface is described herein. The taped surface comprises a surface having an outer face. The taped surface further comprises a tape as disclosed herein adhered to the outer face of the surface.

DETAILED DESCRIPTION

The present disclosure generally relates to butyl rubber based formulations that, when employed for example in pressure sensitive tape applications, provide advantageous performance characteristics. In particular, the present disclosure generally relates to halogenated butyl rubber based formulations that, when employed for example in pressure sensitive tape applications, provide advantageous performance characteristics. For example, it is beneficial for a pressure sensitive adhesive to exhibit high peel adhesion, allowing the adhesive to strongly bond to a substrate to which it is applied. It is also beneficial for pressure sensitive adhesives to have high shear resistance, permitting the adhesive to resist creep or slippage in response to forces applied parallel to the bonding surface. It is difficult, however, for conventional butyl based adhesive formulations to simultaneously meet these performance demands. While butyl based adhesives are often characterized by high peel adhesion, the viscoelastic nature of the adhesive compositions typically do not provide them with strong shear resistance.

It is generally known that the shear resistance of butyl rubber can be improved by submitting the rubber to a curing process. The traditional methods for curing butyl rubber usually require high temperatures and long residence times. For example, the most common industrial applications for butyl rubber are as components of vehicle tires and inner tubes. In these cases, the butyl rubber is typically sulfur vulcanized, e.g., cured, at highly elevated temperatures between 150° C. and 200° C. for time periods greater than 20 minutes. Other curing chemistries, e.g., quinoid, phenolic resin, and zinc oxide, are also available and widely practiced, but in general these systems suffer from the same drawbacks, e.g., high temperatures and long curing times. The extreme conditions of conventional butyl rubber curing are not readily compatible with processes used for other industries. For example, the coating, drying, and curing steps of most adhesive tape manufacturing processes require lower temperatures and shorter residence times than those practiced in butyl rubber vulcanization.

Certain formulations of halogenated butyl rubber based adhesive compositions described herein can surprisingly provide both high adhesion and high shear resistance. In particular, it has been found that by formulating the adhesive composition with certain amounts and types of a multifunctional crosslinker and polyisobutylene oligomers, the resulting adhesive composition can exhibit these performance characteristics without the need for a high temperature curing procedure. Rather, with the disclosed compositions once the crosslinker, and optionally a catalyst, is added to the rubber, a reaction can commence at a slow rate and at lower temperatures, e.g., ambient or room temperature (defined herein as about 20° C. to 30° C.), increasing the viscosity of the composition. The composition can then be coated before the viscosity reaches a desired upper limit. The crosslinker and catalyst can be selected to influence the rate at which the desired viscosity increase occurs, and the amount of time needed between crosslinker addition and adhesive layer coating.

Described herein are preferred formulations of the butyl rubber based pressure sensitive adhesive compositions including relatively high amounts of the polyisobutylene oligomer component. These oligomers are known to have the effect of lowering the modulus and melt viscosity of adhesives, which improves the tackiness and peel adhesion properties, but negatively affects the cohesive strength, shear, and high temperature properties of the adhesive. As a result, conventional formulations of butyl rubber based pressure sensitive adhesives typically limit the amount of polyisobutylene oligomer to no more than 20 wt % to 30 wt % of the total adhesive mass. When the components of the presently disclosed compositions are provided together, though, significantly higher oligomer concentrations can advantageously be used, and in some cases these formulations demonstrate particularly beneficial combinations of performance characteristics. In one example, the high loading of oligomer produces an adhesive that is initially extremely soft and has the mechanical properties of a viscous liquid. By combining the high oligomer loading with the disclosed multifunctional crosslinker rubber curing, an adhesive is produced that advantageously provides excellent tack and peel and at the same time resists flow and creep over long time scales and elevated temperatures. The provided formulations and methods thus produce adhesives that surprisingly and beneficially combine the low surface energy and tack properties of a rubber based adhesive with the temperature resistance and holding power of a high performance acrylic adhesive.

Adhesive Compositions

In one embodiment, an adhesive composition is disclosed. The adhesive composition includes halogenated butyl rubber, polyisobutylene oligomers, and a multifunctional crosslinker. The mass of the polyisobutylene oligomers in the adhesive composition can be greater than that of the (halogenated) butyl rubber. Advantageously, the adhesive composition exhibits a static shear of greater than 100 minutes when measured using a stainless steel surface and a 1-kilogram mass (as measured by Static Shear PTSC-7).

Halogenated Butyl Rubber

The butyl rubber of the disclosed formulations can vary widely, and may be suitable butyl rubbers are known and commercially available. As noted above, the butyl rubber of the adhesive composition can be halogenated to increase reactivity with the multifunctional crosslinker. Commercial grades of butyl rubber suitable for formulating the adhesive compositions of the present disclosure include, for example, EXXON™ CHLOROBUTYL 1066, EXXON™ CHLOROBUTYL 1055, EXXON™ BROMOBUTYL 2222, EXXON™ BROMOBUTYL 2255, EXXON™ BROMOBUTYL 2244, and EXXPRO™ SPECIALTY ELASTOMER 3433, EXXPRO™ SPECIALTY ELASTOMER 3035, EXXPRO™ SPECIALTY ELASTOMER 3745, all available from ExxonMobil (Irving, TX).

The concentration of the halogenated butyl rubber in the adhesive composition can range, for example from 10 wt % to 40 wt %, e.g., from 10 wt % to 28 wt %, from 13 wt % to 31 wt %, from 16 wt % to 34 wt %, from 19 wt % to 37 wt %, or from 22 wt % to 40 wt %. The halogenated butyl rubber concentration can range from 15 wt % to 35 wt %, e.g., from 15 wt % to 27 wt %, from 17 wt % to 29 wt %, from 19 wt % to 31 wt %, from 21 wt % to 33 wt %, or from 23 wt % to 35 wt %. In terms of lower limits, the halogenated butyl rubber concentration can be less than 40 wt %, e.g., less than 37 wt %, less than 35 wt %, less than 33 wt %, less than 31 wt %, less than 29 wt %, less than 27 wt %, less than 25 wt %, less than 23 wt %, less than 21 wt %, less than 19 wt %, less than 17 wt %, less than 15 wt %, or less than 13 wt %. In terms of lower limits, the halogenated butyl rubber concentration can be greater than 10 wt %, e.g., greater than 13 wt %, greater than 15 wt %, greater than 17 wt %, greater than 19 wt %, greater than 21 wt %, greater than 23 wt %, greater than 25 wt %, greater than 27 wt %, greater than 29 wt %, greater than 31 wt %, greater than 33 wt %, greater than 35 wt %, or greater than 37 wt %. Higher concentrations, e.g., greater than 40 wt %, and lower concentrations, e.g., less than 10 wt %, are also contemplated.

The Mooney viscosity of the halogenated butyl rubber can range, for example, from 25 Mooney-units to 47 Mooney-units, e.g., from 25 Mooney-units to 37 Mooney-units, from 27 Mooney-units to 39 Mooney-units, from 29 Mooney-units to 41 Mooney-units, from 31 Mooney-units to 43 Mooney-units, or from 33 Mooney-units to 45 Mooney-units. In terms of upper limits, the halogenated butyl rubber Mooney viscosity can be less than 45 Mooney-units, e.g., less than 43 Mooney-units, less than 41 Mooney-units, less than 39 Mooney-units, less than 37 Mooney-units, less than 35 Mooney-units, less than 33 Mooney-units, less than 31 Mooney-units, less than 29 Mooney-units, or less than 27 Mooney-units. In terms of lower limits, the halogenated butyl rubber Mooney viscosity can be greater than 25 Mooney-units, e.g., greater than 27 Mooney-units, greater than 29 Mooney-units, greater than 31 Mooney-units, greater than 33 Mooney-units, greater than 35 Mooney-units, greater than 37 Mooney-units, greater than 39 Mooney-units, greater than 41 Mooney-units, or greater than 43 Mooney-units. Higher Mooney viscosities, e.g., greater than 45 Mooney-units, and lower Mooney viscosities, e.g., less than 25 Mooney-units, are also contemplated.

Polyisobutylene Oligomers

The polyisobutylene oligomers of the provided adhesive compositions can vary widely. In some cases, the polyisobutylene oligomers are similar in chemical structure to polymeric polyisobutylene and differ only in their respective molecular weights. In some cases, the polyisobutylene oligomers have the same structure as the polymeric polyisobutylene. Oligomers generally differ from polymers by the respective molecular weights. Common polyisobutylene butyl rubber polymers have high molecular weights ranging from 300,000 grams per mole to 600,000 grams per mole, whereas polyisobutylene oligomers have low molecular weights that generally fall in the range of 750 grams per mole to 30,000 grams per mole. Commercially available low molecular weight grades of polyisobutylene oligomers suitable for use in the adhesive compositions disclosed herein include, for example, TPC 750, TPC 1600, and TPC 1350, all available from TPC Group (Houston, TX). Other suitable polybutene oligomers include Indopol™ H-8, Indopol H-300 and Indopol H-18000 from INEOS (Knightsbridge, London).

The number average molecular weight of the polyisobutylene oligomers of the adhesive composition can range, for example, from 500 grams per mole to 30,000 grams per mole, e.g., from 500 grams per mole to 25,000 grams per mole, from 500 grams per mole to 20,000 grams per mole, from 500 grams per mole to 20,000 grams per mole, from 500 grams per mole to 15,000 grams per mole, from 500 grams per mole to 10,000 grams per mole, from 500 grams per mole to 5000 grams per mole, from 500 grams per mole to 3000 grams per mole, from 670 grams per mole to 4100 grams per mole, from 910 grams per mole to 5500 grams per mole, from 1200 grams per mole to 7400 grams per mole, or from 1700 grams per mole to 10,000 grams per mole. In terms of upper limits, the polyisobutylene oligomer molecular weight can be less than 30,000 grams per mole, e.g., less than 25000 grams per mole, less than 20000 grams per mole, less than 15000 grams per mole, less than 10000 grams per mole, less than 7400 grams per mole, less than 5500 grams per mole, less than 4100 grams per mole, less than 3000 grams per mole, less than 2200 grams per mole, less than 1700 grams per mole, less than 1200 grams per mole, less than 910 grams per mole, or less than 670 grams per mole. In terms of lower limits, the polyisobutylene oligomer molecular weight can be greater than 500 grams per mole, e.g., greater than 670 grams per mole, greater than 910 grams per mole, greater than 1200 grams per mole, greater than 1700 grams per mole, greater than 2200 grams per mole, greater than 3000 grams per mole, greater than 4100 grams per mole, greater than 5500 grams per mole, or greater than 7400 grams per mole. Higher molecular weights, e.g., greater than 30,000 grams per mole, and lower molecular weights, e.g., less than 500 grams per mole, are also contemplated.

Preferably, the concentration of the polyisobutylene oligomers is greater than that of the halogenated rubber in the adhesive composition. The concentration of the polyisobutylene oligomers can range, for example, from 40 wt % to 90 wt %, e.g., from 40 wt % to 70 wt %, from 45 wt % to 75 wt %, from 50 wt % to 80 wt %, from 55 wt % to 85 wt %, or from 60 wt % to 90 wt %. The polyisobutylene oligomer concentration can range from 65 wt % to 85 wt %, e.g., from 65 wt % to 77 wt %, from 67 wt % to 79 wt %, from 69 wt % to 81 wt %, from 71 wt % to 83 wt %, or from 73 wt % to 85 wt %. In terms of upper limits, the polyisobutylene oligomer concentration can be less than 90 wt %, e.g., less than 85 wt %, less than 83 wt %, less than 81 wt %, less than 79 wt %, less than 77 wt %, less than 75 wt %, less than 73 wt %, less than 71 wt %, less than 69 wt %, less than 67 wt %, less than 65 wt %, less than 60 wt %, less than 55 wt %, less than 50 wt %, or less than 45 wt %. In terms of lower limits, the polyisobutylene oligomer concentration can be greater than 40 wt %, e.g., greater than 45 wt %, greater than 50 wt %, greater than 55 wt %, greater than 60 wt %, greater than 65 wt %, greater than 67 wt %, greater than 69 wt %, greater than 71 wt %, greater than 73 wt %, greater than 75 wt %, greater than 77 wt %, greater than 79 wt %, greater than 81 wt %, greater than 83 wt %, or greater than 85 wt %. Higher concentrations, e.g., greater than 90 wt %, and lower concentrations, e.g., less than 40 wt %, are also contemplated. By employing the polyisobutylene oligomers at these concentrations (along with the multifunctional crosslinkers) the beneficial combination of performance characteristics is unexpectedly achieved.

The kinematic viscosity of the polyisobutylene oligomers at 100° C. can range, for example, from 50 centistokes to 5000 centistokes, e.g., from 50 centistokes to 790 centistokes, from 79 centistokes to 1300 centistokes, from 130 centistokes to 2000 centistokes, from 200 centistokes to 3200 centistokes, or from 320 centistokes to 5000 centistokes. In terms of upper limits, the polyisobutylene oligomer kinematic viscosity can be less than 5000 centistokes, e.g., less than 3200 centistokes, less than 2000 centistokes, less than 1300 centistokes, less than 790 centistokes, less than 500 centistokes, less than 320 centistokes, less than 200 centistokes, less than 130 centistokes, or less than 79 centistokes. In terms of lower limits, the polyisobutylene oligomer kinematic viscosity can be greater than 50 centistokes, e.g., greater than 79 centistokes, greater than 130 centistokes, greater than 200 centistokes, greater than 320 centistokes, greater than 500 centistokes, greater than 790 centistokes, greater than 1300 centistokes, greater than 2000 centistokes, or greater than 3200 centistokes. Higher dynamic viscosities, e.g., greater than 5000 centistokes, and lower dynamic viscosities, e.g., less than 50 centistokes, are also contemplated.

Multifunctional Crosslinker

In some embodiments, the multifunctional crosslinker (also referred to herein as "crosslinker") includes one or more amines. In certain aspects, the multifunctional crosslinker is a polyamine crosslinker. In some embodiments, at least one multifunctional crosslinker is an amine crosslinker, a phosphine crosslinker, and combinations thereof. The multifunctional crosslinker can include, for example, triethylenetetramine, hexamethylene diamine, polyalkene oxide diamine, polyalkene oxide triamine, or a combination thereof. In some embodiments, the multifunctional crosslinker consists of triethylenetetramine, hexamethylene diamine, polyalkene oxide diamine, polyalkene oxide triamine, or a combination thereof. In certain aspects, the multifunctional crosslinker includes triethylenetetramine. In certain aspects, the multifunctional crosslinker includes hexamethylene diamine. In certain aspects, the multifunctional crosslinker includes polyalkene oxide diamine. In certain aspects, the multifunctional crosslinker includes polyalkene oxide triamine. In some embodiments, the multifunctional crosslinker consists of triethylenetetramine.

Other useful crosslinking agents include monomeric and polymeric melamine crosslinkers, such as CYMEL® 303 and CYMEL® 370 available from Cytec. In some embodiments, the multifunctional crosslinker includes one or more phosphines.

The concentration of the multifunctional crosslinker in the adhesive composition can range, for example, from 0.01 wt % to 4 wt %, e.g., from 0.01 wt % to 0.36 wt %, from 0.018 wt % to 0.66 wt %, from 0.033 wt % to 1.2 wt %, from 0.06 wt % to 2.2 wt %, or from 0.11 wt % to 4 wt %. The multifunctional crosslinker concentration can range from 0.03 wt % to 2 wt %, e.g., from 0.03 wt % to 0.37 wt %, from 0.046 wt % to 0.57 wt %, from 0.069 wt % to 0.86 wt %, from 0.11 wt % to 1.3 wt %, or from 0.16 wt % to 2 wt %. The multifunctional crosslinker concentration can range from 0.05 wt % to 1 wt %, e.g., from 0.05 wt % to 0.3 wt %, from 0.067 wt % to 0.41 wt %, from 0.091 wt % to 0.55 wt %, from 0.12 wt % to 0.74 wt %, or from 0.17 wt % to 1 wt %. In terms of upper limits, the multifunctional crosslinker concentration can be less than 4 wt %, e.g., less than 2.2 wt %, less than 2 wt %, less than 1.3 wt %, less than 1 wt %, less than 0.74 wt %, less than 0.55 wt %, less than 0.41 wt %, less than 0.3 wt %, less than 0.22 wt %, less than 0.17 wt %, less than 0.12 wt %, less than 0.091 wt %, less than 0.067 wt %, less than 0.05 wt %, less than 0.033 wt %, or less than 0.018 wt %. In terms of lower limits, the multifunctional crosslinker concentration can be greater than 0.01 wt %, e.g., greater than 0.018 wt % greater than 0.033 wt %, greater than 0.05 wt %, greater than 0.067 wt %, greater than 0.091 wt %, greater than 0.12 wt %. greater than 0.17 wt %, greater than 0.22 wt %, greater than 0.3 wt %, greater than 0.41 wt %, greater than 0.55 wt %, greater than 0.74 wt %, greater than 1 wt %, greater than 1.3 wt %, greater than 2 wt %, or greater than 2.2 wt %. Higher concentrations, e.g., greater than 4 wt %, and lower concentrations, e.g., less than 0.01 wt %, are also contemplated.

Catalysts

In some embodiments, the adhesive composition includes one or more catalysts selected and added to speed the crosslinking and curing reaction. This can in turn allow for faster line speeds and/or lower temperatures in adhesive tape manufacturing processes. In some cases, the catalyst type and concentration can be selected to advantageously balance the faster line speeds and/or lower manufacturing temperatures with the pot life of the compounded adhesive.

In some embodiments, the one or more catalysts of the adhesive composition include one or more alkylamines. In certain aspects, the alkylamines include one or more tertiary alkylamines. The tertiary alkylamines can include, for example, 1,4-diazabicyclo[2.2.2]octane, 1-azabicyclo[2.2.2]octane, or a combination thereof. In some embodiments, the catalyst consists of 1,4-diazabicyclo[2.2.2]octane. In some embodiments, the catalyst consists of 1-azabicyclo[2.2.2]octane.

The concentration of the one or more catalysts in the adhesive composition can range, for example, from 0.01 wt % to 1.3 wt %, e.g., from 0.01 wt % to 0.19 wt %, from 0.016 wt % to 0.31 wt %, from 0.027 wt % to 0.5 wt %, from 0.043 wt % to 0.82 wt %, or from 0.071 wt % to 1.3 wt %. In terms of upper limits, the catalyst concentration can be less than 1.3 wt %, e.g., less than 0.82 wt %, less than 0.5 wt %, less than 0.31 wt %, less than 0.19 wt %, less than 0.12 wt %, less than 0.071 wt %, less than 0.043 wt %, less than 0.027 wt %, or less than 0.016 wt %. In terms of lower limits, the catalyst concentration can be greater than 0.01 wt %, greater than 0.016 wt %, greater than 0.027 wt %, greater than 0.043 wt %, greater than 0.071 wt %, greater than 0.12 wt %, greater than 0.19 wt %, greater than 0.31 wt %, greater than 0.5 wt %, or greater than 0.82 wt %. Higher concentrations, e.g., greater than 1.3 wt %, and lower concentrations, e.g., less than 0.01 wt %, are also contemplated.

Other Additives

In some embodiments, the adhesive composition further includes one or more non-nucleophilic bases. The non-nucleophilic bases can include, for example, calcium carbonate. In certain aspects, the non-nucleophilic base consists of calcium carbonate.

The adhesive composition can further include one or more additives. Nonlimiting examples of suitable additives include one or more waxes, surfactants, talc, powdered silicates, filler agents, defoamers, colorants, antioxidants, UV stabilizers, luminescents, crosslinkers, buffer agents, anti-blocking agents, wetting agents, matting agents, antistatic agents, acid scavengers, flame retardants, processing aids, extrusion aids, and others. Pigment, if desired, is provided in an amount sufficient to impart the desired color to the adhesive. Examples of pigments include, without limitation, carbon black, titanium dioxide and the like, and organic dyes.

Performance Characteristics

An advantage of the adhesive compositions disclosed herein is that they are surprisingly capable of exhibiting strong adhesive properties while also providing good shear performance. For reasons discussed above, it is challenging for butyl base pressure sensitive adhesives to simultaneously achieve these separate characteristics in the absence of a high temperature and time intensive curing process.

One measure of the shear performance of adhesive compositions is static shear, which can be determined with relation to a stainless steel surface according to the standard protocol Static Shear PTSC-7. The 1-kilogram stainless steel static shear of the adhesive compositions disclosed herein can range, for example, from 55 minutes to 18,000 minutes, e.g., from 55 minutes to 1800 minutes, from 100 minutes to 3200 minutes, from 180 minutes to 5700 minutes, from 310 minutes to 10,000 minutes, or from 560 minutes to 18,000 minutes. In terms of upper limits, the stainless static shear can be less than 18,000 minutes, e.g., less than 10,000 minutes, less than 5700 minutes, less than 3200 minutes, less than 1800 minutes, less than 1000 minutes, less than 560 minutes, less than 310 minutes, less than 180 minutes, or less than 100 minutes. In terms of lower limits, the stainless steel shear can be greater than 55 minutes, e.g., greater than 100 minutes, greater than 180 minutes, greater than 310 minutes, greater than 560 minutes, greater than 1000 minutes, greater than 1800 minutes, greater than 3200 minutes, greater than 5700 minutes, or greater than 10,000 minutes. Higher static shears, e.g., greater than 18,000 minutes, and lower static shears, e.g., less than 55 minutes, are also contemplated.

Another measure of the shear performance of adhesive compositions is the shear adhesion failure temperature (SAFT), which can be determined with relation to a stainless steel surface according to the standard protocol ASTM D4498 (2007). The 500-gram stainless steel shear adhesion failure temperature of the adhesive compositions disclosed herein can range, for example, from 55° C. to 500° C., e.g., from 55° C. to 322° C., from 100° C. to 367° C., from 144° C. to 411° C., from 189° C. to 456° C., or from 233° C. to 500° C. In terms of upper limits, the shear adhesion failure temperature can be less than 500° C., e.g., less than 456° C., less than 411° C., less than 367° C., less than 322° C., less than 278° C., less than 233° C., less than 189° C., less than 144° C., or less than 100° C. In terms of lower limits, the stainless steel shear adhesion failure temperature can be greater than 55° C., e.g., greater than 100° C., greater than 144° C., greater than 189° C., greater than 233° C., greater than 278° C., greater than 322° C., greater than 367° C., greater than 411° C., or greater than 456° C. Higher shear adhesion failure temperatures, e.g., greater than 500° C., and lower shear adhesion failure temperatures, e.g., less than 55° C., are also contemplated.

Another measure of the shear performance of adhesive compositions is the dynamic shear, which can be determined with relation to a stainless steel surface according to the standard protocol ASTM D1002 (2019). The stainless steel dynamic shear of the adhesive compositions disclosed herein can range, for example, from 0.034 Newtons per square millimeter to 0.379 Newtons per square millimeter, e.g., 0.034 Newtons per square millimeter to 0.241 Newtons per square millimeter, from 0.069 Newtons per square millimeter to 0.276 Newtons per square millimeter, from 0.103 Newtons per square millimeter to 0.310 Newtons per square millimeter, from 0.138 Newtons per square millimeter to 0.345 Newtons per square millimeter, or 0.172 Newtons per square millimeter to 0.379 Newtons per square millimeter. In terms of upper limits, the dynamic shear can be less than 0.379 Newtons per square millimeter, e.g., less than 0.345 Newtons per square millimeter, less than 0.310 Newtons per square millimeter, less than 0.276 Newtons per square millimeter, less than 0.241 Newtons per square millimeter, less than 0.207 Newtons per square millimeter, less than 0.172 Newtons per square millimeter, less than 0.138 Newtons per square millimeter, less than 0.103 Newtons per square millimeter, or less than 0.069 Newtons per square millimeter. In terms of lower limits, the stainless steel dynamic shear can be greater than 0.034 Newtons per square millimeter, e.g., greater than 0.069 Newtons per square millimeter, greater than 0.103 Newtons per square millimeter, greater than 0.138 Newtons per square millimeter, greater than 0.172 Newtons per square millimeter, greater than 0.207 Newtons per square millimeter, greater than 0.241 Newtons per square millimeter, greater than 0.276 Newtons per square millimeter, greater than 0.310 Newtons per square millimeter, or greater than 0.345 Newtons per square millimeter. Higher dynamic shears, e.g., greater than 0.379 Newtons per square millimeter, and lower dynamic shears, e.g., less than 0.034 Newtons per square millimeter, are also contemplated.

One measure of the adhesive performance of adhesive compositions is peel adhesion, which can be determined with relation to a stainless steel or high density polyethylene surfaces according to the standard protocol Peel Adhesion PSTC-1. The stainless steel peel adhesion of the adhesive compositions disclosed herein can range, for example, from 175 Newtons per meter to 1926 Newtons per meter, e.g., from 175 Newtons per meter to 1225 Newtons per meter, from 350 Newtons per meter to 1400 Newtons per meter, from 525 Newtons per meter to 1575, from 700 Newtons per meter to 1750 Newtons per meter, from 875 Newtons per meter to 1925 Newtons per meter. In terms of upper limits, the stainless steel peel adhesion can be less than 1925 Newtons per meter, e.g., less than 1750 Newtons per meter, less than 1575 Newtons per meter, less than 1400 Newtons per meter, less than 1225 Newtons per meter, less than 1050 Newtons per meter, less than 875 Newtons per meter, less than 700 Newtons per meter, less than 525 Newtons per meter, or less than 350 Newtons per meter. In terms of lower limits, the stainless steel peel adhesion can be greater than 175 Newtons per meter, e.g., greater than 350 Newtons per meter, greater than 525 Newtons per meter, greater than 700 Newtons per meter, greater than 875 Newtons per meter, greater than 1050 Newtons per meter, greater than 1225 Newtons per meter, greater than 1400 Newtons per meter, greater than 1575 Newtons per meter, or greater than 1750 Newtons per meter. Higher peel adhesions, e.g., greater than 1925 Newtons per meter, and lower peel adhesions, e.g., less than 175 Newtons per meter, are also contemplated.

The high density polyethylene peel adhesion of the adhesive compositions disclosed herein can range, for example, from 85 Newtons per meter to 960 Newtons per meter, e.g., from 85 Newtons per meter to 615 Newtons per meter, from 175 Newtons per meter to 700 Newtons per meter, from 260 Newtons per meter to 790 Newtons per meter, from 350 Newtons per meter to 875 Newtons per meter, or from 440 Newtons per meter to 960 Newtons per meter. In terms of upper limits, the high density polyethylene peel adhesion can be less than 960 Newtons per meter, e.g., less than 875 Newtons per meter, less than 790 Newtons per meter, less than 700 Newtons per meter, less than 615 Newtons per meter, less than 525 Newtons per meter, less than 440 Newtons per meter, less than 350 Newtons per meter, less than 260 Newtons per meter, or less than 175 Newtons per meter. In terms of lower limits, the high density polyethylene peel adhesion can be greater than 85 Newtons per meter, e.g., greater than 175 Newtons per meter, greater than 260 Newtons per meter, greater than 350 Newtons per meter, greater than 440 Newtons per meter, greater than 525 Newtons per meter, greater than 615 Newtons per meter, greater than 700 Newtons per meter, greater than 790 Newtons per meter, or greater than 875 Newtons per meter. Higher peel adhesions, e.g., greater than 960 Newtons per meter, and lower peel adhesions, e.g., less than 85 Newtons per meter, are also contemplated.

Tapes

The present disclosure also relates to tapes that include at least one adhesive layer of an adhesive composition provided herein. In some embodiments, the tape further includes a substrate, e.g., a backing layer, wherein at least a portion of substrate is coated with the at least one adhesive layer. In some embodiments, one or more intervening layers are disposed between the substrate and the adhesive layer. In certain cases, the substrate is coextensive with the adhesive layer.

The substrate can be in the form of a single layer. Alternatively, a multilayer substrate can be used in which the substrate includes two or more layers. The substrates of the provided tapes can include, for example, various polymeric films, metals or metallic foils, and composites thereof. The substrates can also include silane or ceramic coated fiber cloth material(s).

One or more layers of the substrate can be a metallic foil such as aluminum and/or an aluminum alloy material. One or more layers of the substrate can be stainless steel and/or alloyed steel foil.

The substrate can include coated cloth materials, e.g., fibrous woven and/or nonwoven materials formed from fibrous materials. A non-limiting example of a cloth material is a woven or nonwoven material formed from glass fibers. In certain embodiments the fibers can be coated with one or more other materials.

In some embodiments, the substrate of the adhesive tape includes one or more plastics. The substrate can include or be formed from any suitable polymer or mixture of polymers. The substrate can include a thermoplastic polymer. The polymer or mixture of polymers of the substrate can include, for example, polyethylene terephthalate (PET), recycled polyethylene terephthalate (rPET), high density polyethylene (HDPE), polyvinyl chloride (PVC), poly lactic acid (PLA), cellulose, biopolymer films, low density polyethylene (LDPE), polypropylene (PP), polystyrene (PS), polyesters, or other types of polymers or plastics. In some embodiments, the substrate comprises PET. In some embodiments, the substrate consists of PET. In some embodiments, the substrate consists essentially of PET.

The substrate can have a thickness ranging from 5 microns to 10,000 microns, e.g., from 5 microns to 480 microns, from 11 microns to 1000 microns, from 23 microns to 2200 microns, from 49 microns to 4700 microns, or from 100 microns to 10,000 microns. In terms of upper limits, the substrate thickness can be less than 10,000 microns, e.g., less than 4700 microns, less than 2200 microns, less than 1000 microns, less than 480 microns, less than 220 microns, less than 100 microns, less than 49 microns, less than 23 microns, or less than 11 microns. In terms of lower limits, the substrate thickness can be greater than 5 microns, e.g., greater than 11 microns, greater than 23 microns, greater than 49 microns, greater than 100 microns, greater than 220 microns, greater than 480 microns, greater than 1000 microns, greater than 2200 microns, or greater than 4700 microns. Larger thicknesses, e.g., greater than 10,000 microns, and smaller thicknesses, e.g., less than 5 microns, are also contemplated.

In some embodiments, the substrate is a release liner. The adhesive tape can include one or more release liners disposed on one or both of the major exterior faces of the tape. The release liners can function as a protective cover such that the release liner remains in place until the sheet is ready for attachment to an object or surface. If a liner or release liner is included in the adhesive tape, a wide array of materials and configurations can be used for the liner. In many embodiments, the liner is a siliconized release liner. In many other embodiments, the liner is a paper or paper-based material. In many other embodiments, the liner is a polymeric film of one or more polymeric materials. Typically, at least one face of the liner is coated with a release material such as a silicone or silicone-based material. The liner can be in the form of a single sheet. Alternatively, the liner can be in the form of multiple sections or panels.

The coat weight and thickness of the tape adhesive layer can be selected to supply adequate adhesive to provide a desired level of adhesion and tack, but not so much as to unnecessarily increase the dimensions of the adhesive tape. In certain aspects, smaller adhesive layer coat weights and thicknesses can be associated with reduced manufacturing costs for the adhesive tape.

The thickness of the adhesive layer can range, for example, from 10 microns to 2000 microns, e.g., from 10 microns to 240 microns, from 17 microns to 410 microns, from 29 microns to 690 microns, from 49 microns to 1200 microns, or from 83 microns to 2000 microns. In terms of upper limits, the adhesive layer thickness can be less than 2000 microns, e.g., less than 1200 microns, less than 690 microns, less than 410 microns, less than 240 microns, less than 140 microns, less than 83 microns, less than 49 microns, less than 29 microns, or less than 17 microns. In terms of lower limits, the adhesive layer thickness can be greater than 10 microns, e.g., greater than 17 microns, greater than 29 microns, greater than 49 microns, greater than 83 microns, greater than 140 microns, greater than 240 microns, greater than 410 microns, greater than 690 microns, or greater than 1200 microns. Larger thicknesses, e.g., greater than 2000 microns, and smaller thicknesses, e.g., less than 10 microns, are also contemplated.

The coat weight if the adhesive layer can range, for example, from 30 grams per square meter to 300 grams per square meter, e.g., from 30 grams per square meter to 192 grams per square meter, from 57 grams per square meter to 219 grams per square meter, from 84 grams per square meter to 246 grams per square meter, from 111 grams per square meter to 273 grams per square meter, or from 138 grams per square meter to 300 grams per square meter. In terms of upper limits, the adhesive layer coat weight can be less than 300 grams per square meter, e.g., less than 273 grams per square meter, less than 246 grams per square meter, less than 219 grams per square meter, less than 192 grams per square meter, less than 165 grams per square meter, less than 138 grams per square meter, less than 111 grams per square meter, less than 84 grams per square meter, or less than 57 grams per square meter.

Methods

The present disclosure also relates to processes of producing the provided adhesive compositions. The methods include providing a halogenated butyl rubber, a polyisobutylene oligomer, and a multifunctional crosslinker. The methods can further include selecting the type and relative amounts of the halogenated butyl rubber, the polyisobutylene oligomers, and the multifunctional crosslinker to provide desired adhesion and shear properties to the resulting adhesive composition. The methods further include combining halogenated butyl rubber and the polyisobutylene oligomers to form a mixture. The methods further include adding the multifunctional crosslinker to the mixture to form the adhesive composition.

In some embodiments, the mixture further includes a solvent, e.g., an organic solvent or hydrocarbon solvent. The solvent can include, for example, toluene, heptane, hexane, cyclohexane, tetrahydrofuran, or combinations thereof.

The solids content of the mixture can range, for example, from 30 wt % to 70 wt %, e.g., from 30 wt % to 54 wt %, from 34 wt % to 58 wt %, from 38 wt % to 62 wt %, 42 wt % to 66 wt %, or from 46 wt % to 70 wt %. In terms of upper limits, the solids content can be less than 70 wt %, e.g., less than 66 wt %, less than 62 wt %, less than 58 wt %, less than 54 wt %, less than 50 wt %, less than 46 wt %, less than 42 wt %, less than 38 wt %, or less than 34 wt %. In terms of lower limits, the solids content can be greater than 30 wt %, e.g., greater than 34 wt %, greater than 38 wt %, greater than 42 wt %, greater than 46 wt %, greater than 50 wt %, greater than 54 wt %, greater than 58 wt %, greater than 62 wt %, or greater than 66 wt %. Higher solids contents, e.g., greater than 70 wt %, and lower solids contents, e.g., less than 30 wt %, are also contemplated.

The present disclosure also relates to processes of producing the provided adhesive tapes. The methods include providing adhesive composition as disclosed herein, and a substrate. The methods further include coating a layer of the adhesive composition onto the substrate. The thickness and coat weight of the adhesive layer can be as described above. The method can further include curing the adhesive subsequent to coating the backing layer with the adhesive composition. The curing can be carried out under conditions suitable for the crosslinker to react with the functional groups of the adhesive composition. The curing conditions can include a suitable curing time and curing temperature.

As discussed above, an advantage of the adhesive compositions and tapes disclosed herein is that the curing temperature used to provide them with improved shear resistance can be lower than those of conventional butyl rubber curing processes. The curing temperature can range, for example, from 50° C. to 150° C., e.g., from 50° C. to 110° C., from 60° C. to 120° C., from 70° C. to 130° C., from 80° C. to 140° C., or from 90° C. to 150° C. In terms of upper limits, the curing temperature can be less than 150° C., e.g., less than 140° C., less than 130° C., less than 120° C., less than 110° C., less than 100° C., less than 90° C., less than 80° C., less than 70° C., or less than 60° C. In terms of lower limits, the curing temperature can be greater than 50° C., e.g., greater than 60° C., greater than 70° C., greater than 80° C., greater than 90° C., greater than 100° C., greater than 110° C., greater than 120° C., greater than 130° C., or greater than 140° C. Higher curing temperatures, e.g., greater than 150° C., and lower curing temperatures, e.g., less than 50° C., are also contemplated.

Another advantage of the provided adhesive compositions and tapes is that the curing time used to provide them with improved shear resistance can be less than that of conventional butyl rubber curing processes. The curing time can range, for example, from 0.5 minutes to 9 minutes, e.g., from 0.5 minutes to 2.8 minutes, from 0.7 minutes to 3.8 minutes, from 0.9 minutes to 5 minutes, from 1.2 minutes to 6.7 minutes, or from 1.6 minutes to 9 minutes. In terms of upper limits, the curing time can be less than 9 minutes, e.g., less than 6.7 minutes, less than 5 minutes, less than 3.8 minutes, less than 2.8 minutes, less than 2.1 minutes, less than 1.6 minutes, less than 1.2 minutes, less than 0.9 minutes, or less than 0.7 minutes. In terms of lower limits, the curing time can be greater than 0.5 minutes, e.g., greater than 0.7 minutes, greater than 0.9 minutes, greater than 1.2 minutes, greater than 1.6 minutes, greater than 2.1 minutes, greater than 2.8 minutes, greater than 3.8 minutes, greater than 5 minutes, or greater than 6.7 minutes. Longer curing times, e.g., greater than 9 minutes, and shorter curing times, e.g., less than 0.5 minutes, are also contemplated.

EMBODIMENTS

The following embodiments are contemplated. All combinations of features and embodiments are contemplated.

Embodiment 1: An adhesive composition comprising: halogenated butyl rubber; polyisobutylene oligomers; and a multifunctional crosslinker; wherein the adhesive composition has a 1-kilogram stainless steel static shear greater than 100 minutes as measured by Static Shear PTSC-7.

Embodiment 2: An embodiment of embodiment 1, wherein the concentration of the polyisobutylene oligomers in the adhesive composition is greater than 50 wt %.

Embodiment 3: An embodiment of embodiment 1, wherein the concentration of the polyisobutylene oligomers in the adhesive composition is greater than 65 wt %.

Embodiment 4: An embodiment of any of the embodiments of embodiment 1-3, wherein the concentration of the multifunctional crosslinker in the adhesive composition ranges from 0.01 wt % to 4 wt %.

Embodiment 5: An embodiment of any of the embodiments of embodiment 1-4, wherein the multifunctional crosslinker comprises an amine crosslinker.

Embodiment 6: An embodiment of embodiment 5, wherein the amine is selected from the group consisting of triethylenetetramine, hexamethylene diamine, polyalkene oxide diamine, polyalkene oxide triamine, and combinations thereof.

Embodiment 7: An embodiment of any of the embodiments of embodiment 1-6, wherein the multifunctional crosslinker comprises a phosphine crosslinker.

Embodiment 8: An embodiment of any of the embodiments of embodiment 1-7, further comprising one or more catalysts.

Embodiment 9: An embodiment of embodiment 8, wherein the concentration of the one or more catalysts in the adhesive composition is less than 0.5 wt %.

Embodiment 10: An embodiment of embodiment 8 or 9, wherein the one or more catalysts comprise one or more alkylamines.

Embodiment 11: An embodiment of embodiment 10, wherein the one or more alkylamines comprise one or more tertiary alkylamines.

Embodiment 12: An embodiment of embodiment 11, wherein the one or more tertiary alkylamines comprise 1,4-diazabicyclo[2.2.2]octane or 1-azabicyclo[2.2.2]octane.

Embodiment 13: An embodiment of any of the embodiments of embodiment 1-12, further comprising a non-nucleophilic base.

Embodiment 14: An embodiment of embodiment 13, wherein the non-nucleophilic base comprises calcium carbonate.

Embodiment 16: An embodiment of any of the embodiments of embodiment 1-15, having a 1-kilogram stainless steel static shear greater than 1000 minutes as measured by Static Shear PTSC-7.

Embodiment 17: An embodiment of any of the embodiments of embodiment 1-16, having a 1-kilogram stainless steel static shear greater than 3200 minutes as measured by Static Shear PTSC-7.

Embodiment 18: An embodiment of any of the embodiments of embodiment 1-17, having a 1-kilogram stainless steel static shear greater than 10,000 minutes as measured by Static Shear PTSC-7.

Embodiment 19: An embodiment of any of the embodiments of embodiment 1-18, having a stainless steel shear adhesion failure temperature greater than 100° C.

Embodiment 20: An embodiment of any of the embodiments of embodiment 1-19, having a stainless steel dynamic shear greater than 0.069 Newtons per square millimeter.

Embodiment 21: An embodiment of any of the embodiments of embodiment 1-20, having a stainless steel peel adhesion greater than 350 Newtons per meter.

Embodiment 22: An embodiment of any of the embodiments of embodiment 1-21, having a high density polyethylene peel adhesion greater than 175 Newtons per meter.

Embodiment 23: An embodiment of any of the embodiments of embodiment 1-22, comprising: from about 10 wt % to about 40 wt % halogenated butyl rubber; from about 60 wt % to about 90 wt % polyisobutylene oligomers; from about 0.03 wt % to about 2 wt % multifunctional crosslinker; and less than about 0.5 wt % catalyst; and having a stainless steel peel adhesion greater than 525 Newtons per meter, and a 1-kilogram stainless steel static shear greater than 1000 minutes as measured by Static Shear PTSC-7.

Embodiment 24: An embodiment of any of the embodiments of embodiment 1-22, comprising: from about 15 wt % to about 35 wt % halogenated butyl rubber; from about 65 wt % to about 85 wt % polyisobutylene oligomers; from about 0.05 wt % to about 1 wt % multifunctional crosslinker; and less than about 0.5 wt % catalyst; and having a stainless steel peel adhesion greater than 525 Newtons per meter, and a stainless steel dynamic shear greater than 0.138 Newtons per square millimeter.

Embodiment 25: An embodiment of any of the embodiments of embodiment 1-24, wherein the number average molecular weight of the polyisobutylene oligomers ranges from 500 grams per mole to 30,000 grams per mole.

Embodiment 26: A method of preparing a tape comprising an adhesive composition, the method comprising: combining halogenated butyl rubber and polyisobutylene oligomers to form a mixture; adding a multifunctional crosslinker to the mixture, thereby forming the adhesive composition of any of the embodiments of embodiment 1-25; coating an adhesive layer comprising the adhesive composition onto a substrate, thereby preparing the tape.

Embodiment 27: An embodiment of embodiment 26, wherein the combining further includes combining a solvent with the halogenated butyl rubber and the polyisobutylene to form the mixture.

Embodiment 28: An embodiment of embodiment 26 or 27, wherein the substrate comprises a backing layer, a release liner, a nonwoven layer, or a foil layer.

Embodiment 29: An embodiment of embodiment 26-28, wherein the mass of the polyisobutylene oligomers in the mixture is greater than the mass of the halogenated butyl rubber in the mixture.

Embodiment 30: An embodiment of any of the embodiments of embodiment 26-29, wherein the adhesive layer has a thickness ranging from 10 microns to 2000 microns.

Embodiment 31: A tape comprising at least one adhesive layer comprising the adhesive composition of any of the embodiments of embodiment 1-25.

Embodiment 32: A method of applying a tape to a surface, the method comprising: providing a surface having an outer face; providing the tape of embodiment 31; adhering the adhesive layer of the tape to the outer face of the surface, thereby applying the tape to the surface.

Embodiment 33: A taped surface comprising: a surface having an outer face; and the tape of embodiment 31 adhered to the outer face of the surface.

EXAMPLES

The present disclosure will be better understood in view of the following non-limiting examples.

A series of adhesives were prepared having the composition shown in Table 1 below. For Example 1 and Comparative Example A, the butyl rubber and polyisobutylene oligomer components were first dissolved in toluene at 50% solids. For Example 2, the butyl rubber component was first dissolved in toluene at 30% total solids and the polyisobutylene oligomer component was first dissolved in toluene at 70% total solids. Once these were fully solvated, triethylenetetramine was added to Examples 1 and 2. No multifunctional crosslinker was added to Comparative Sample A. For Example 2, 1,4-diazabicyclo[2.2.2]octane (DABCO) catalyst was added with the triethylenetetramine. Example 1 and Comparative Example A were then mixed for 10 minutes, and Example 2 was mixed for 5 minutes. After mixing was completed, the adhesive compositions were each coated onto a polyethylene terephthalate release liner at a dry coat weight of 85 grams per square meter. The coatings were dried at 80° C. for 6 minutes, and then cured at 120° C. for 2 minutes.

The resulting pressure sensitive tape films were tested with stainless steel (SS) or high density polyethylene (HDPE) substrates as indicated in Table 1. The data shown in the table indicate that Examples 1 and 2 exhibited significantly higher static shear, dynamic shear, and shear adhesion failure temperature than Comparative Example A. Together these results demonstrate the advantageous shear resistance properties characteristic of the provided adhesion compositions and tapes that include a multifunctional crosslinker. Importantly, the peel adhesion performances of Examples 1 and 2 are similar to that of Comparative Example A, demonstrating that there is no degradation in adhesion performance resulting from the use of the crosslinker.

TABLE 1

|  | Example 1 | Example 2 | Comparative Example A |
|---|---|---|---|
| EXXPRO 3433 (g) | 25 | 17.55 | 25 |
| TPC 1350 (g) | 75 | 52.5 | 75 |
| Triethylenetetramine (g) | 0.125 | 0.158 | |
| DABCO (g) | | 0.0135 | |
| SS peel adhesion (N/m) | 1131 | 730 | 1128 |
| HDPE peel adhesion (N/m) | | 396 | |
| SS static shear (min) | >10,000 | >15,000 | 4.7 |
| SS shear adhesion failure temperature (° C.) | 400 | >400 | * |
| SS dynamic shear (N/mm²) | 0.223 | | 0.027 |

* Sample failed before heating

The term "about" is used herein to modify a numerical value and indicate a defined range around that value. If "X" is the value, "about X" generally indicates a value from 0.90X to 1.10X. Any reference to "about X" indicates at least the values X, 0.90X, 0.91X, 0.92X, 0.93X, 0.94X, 0.95X, 0.96X, 0.97X, 0.98X, 0.99X, 1.01X, 1.02X, 1.03X, 1.04X, 1.05X, 1.06X, 1.07X, 1.08X, 1.09X, and 1.10X. Thus, "about X" is intended to disclose, e.g., "0.98X." When "about" is applied to the beginning of a numerical range, it applies to both ends of the range. Thus, "from about 6 to 8.5" is equivalent to "from about 6 to about 8.5." When "about" is applied to the first value of a set of values, it applies to all values in that set. Thus, "about 7, 9, or 11%" is equivalent to "about 7%, about 9%, or about 11%."

While the disclosure has been described in detail, modifications within the spirit and scope of the disclosure will be readily apparent to those of skill in the art. It should be understood that aspects of the disclosure and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only, and is not intended to limit the disclosure.

We claim:

1. An adhesive composition comprising:
   halogenated butyl rubber;
   polyisobutylene oligomers; and
   a multifunctional crosslinker; wherein the adhesive composition has a 1-kilogram stainless steel static shear greater than 100 minutes as measured by Static Shear PTSC-7;
   wherein the number average molecular weight of the polyisobutylene oligomers ranges from 500 grams per mole to 30,000 grams per mole; and
   wherein the concentration of the polyisobutylene oligomers in the adhesive composition is greater than 50 wt %, and
   wherein the multifunctional crosslinker comprises at least one of an amine crosslinker, a phosphine crosslinker, and combinations thereof.

2. The adhesive composition of claim 1, wherein the concentration of the polyisobutylene oligomers in the adhesive composition is greater than 65 wt %.

3. The adhesive composition of claim 1, wherein the concentration of the multifunctional crosslinker in the adhesive composition ranges from 0.01 wt % to 4 wt %.

4. The adhesive composition of claim 1, wherein the amine is selected from the group consisting of triethylenetetramine, hexamethylene diamine, polyalkene oxide diamine, polyalkene oxide triamine, and combinations thereof.

5. The adhesive composition of claim 1, further comprising one or more catalysts.

6. The adhesive composition of claim 5, wherein the concentration of the one or more catalysts in the adhesive composition is less than 0.5 wt %.

7. The adhesive composition of claim 5, wherein the one or more catalysts comprise one or more alkylamines.

8. The adhesive composition of claim 7, wherein the one or more alkylamines comprise one or more tertiary alkylamines.

9. The adhesive composition of claim 8, wherein the one or more tertiary alkylamines comprise 1,4-diazabicyclo octane or 1-azabicyclo octane.

10. The adhesive composition of claim 1, further comprising a non-nucleophilic base.

11. The adhesive composition of claim 10, wherein the non-nucleophilic base comprises calcium carbonate.

12. The adhesive composition of claim 1, having a 1-kilogram stainless steel static shear greater than 1000 minutes.

13. The adhesive composition of claim 1, having a 1-kilogram stainless steel static shear greater than 3200 minutes.

14. The adhesive composition of claim 1, having a 1-kilogram stainless steel static shear greater than 10,000 minutes.

15. The adhesive composition of claim 1, having a stainless steel shear adhesion failure temperature greater than 100° C.

16. The adhesive composition of claim 1, having a stainless steel dynamic shear greater than 0.069 Newtons per square millimeter.

17. The adhesive composition of claim 1, having a stainless steel peel adhesion greater than 350 Newtons per meter.

18. The adhesive composition of claim 1, having a high density polyethylene peel adhesion greater than 175 Newtons per meter.

19. The adhesive composition of claim 1, comprising:
   from about 10 wt % to about 40 wt % halogenated butyl rubber;
   from about 60 wt % to about 90 wt % polyisobutylene oligomers;
   from about 0.03 wt % to about 2 wt % multifunctional crosslinker; and
   less than about 0.5 wt % catalyst; and having
   a stainless steel peel adhesion greater than 525 Newtons per meter, and
   a 1-kilogram stainless steel static shear greater than 1000 minutes.

20. The adhesive composition of claim 1, comprising:
   from about 15 wt % to about 35 wt % halogenated butyl rubber;
   from about 65 wt % to about 85 wt % polyisobutylene oligomers;
   from about 0.05 wt % to about 1 wt % multifunctional crosslinker; and
   less than about 0.5 wt % catalyst; and having
   a stainless steel peel adhesion greater than 525 Newtons per meter, and
   a stainless steel dynamic shear greater than 0.138 Newtons per square millimeter.

21. A method of preparing a tape comprising an adhesive composition, the method comprising:
   combining halogenated butyl rubber and polyisobutylene oligomers to form a mixture;
   adding a multifunctional crosslinker to the mixture, thereby forming the adhesive composition of claim 1;
   coating an adhesive layer comprising the adhesive composition onto a substrate, thereby preparing the tape.

22. The method of claim 21, wherein the combining further includes combining a solvent with the halogenated butyl rubber and the polyisobutylene to form the mixture.

23. The method of claim 21, wherein the substrate comprises a backing layer, a release liner, a nonwoven layer, or a foil layer.

24. The method of claim 21, wherein the mass of the polyisobutylene oligomers in the mixture is greater than the mass of the halogenated butyl rubber in the mixture.

25. The method of claim 21, wherein the adhesive layer has a thickness ranging from 10 microns to 2000 microns.

26. A tape comprising at least one adhesive layer comprising the adhesive composition of claim 1.

27. A method of applying a tape to a surface, the method comprising:
- providing a surface having an outer face;
- providing the tape of claim 26;
- adhering the adhesive layer of the tape to the outer face of the surface, thereby applying the tape to the surface.

28. A taped surface comprising:
- a surface having an outer face; and
- the tape of claim 26 adhered to the outer face of the surface.

* * * * *